United States Patent
Honig

(10) Patent No.: US 7,171,439 B2
(45) Date of Patent: Jan. 30, 2007

(54) USE OF HASHED CONTENT ADDRESSABLE MEMORY (CAM) TO ACCELERATE CONTENT-AWARE SEARCHES

(75) Inventor: David Honig, Irvine, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 550 days.

(21) Appl. No.: 10/173,206

(22) Filed: Jun. 14, 2002

(65) Prior Publication Data

US 2003/0233514 A1 Dec. 18, 2003

(51) Int. Cl.
*G06F 15/16* (2006.01)

(52) U.S. Cl. ................... 709/200; 711/108; 711/216

(58) Field of Classification Search ............ 711/108, 711/216; 713/153; 709/200–203, 213–216
See application file for complete search history.

(56) References Cited

U.S. PATENT DOCUMENTS

| | | | |
|---|---|---|---|
| 4,056,845 A * | 11/1977 | Churchill, Jr. ............ 711/127 |
| 5,339,398 A | 8/1994 | Shah |
| 5,414,704 A | 5/1995 | Spinney |
| 5,884,297 A | 3/1999 | Noven |
| 5,920,900 A | 7/1999 | Poole et al. |
| 5,930,359 A | 7/1999 | Kempke et al. |
| 5,940,597 A | 8/1999 | Chung |
| 6,061,712 A | 5/2000 | Tzeng |
| 6,118,760 A | 9/2000 | Zaumen et al. |
| 6,226,710 B1 | 5/2001 | Melchior |
| 6,622,168 B1 * | 9/2003 | Datta ...................... 709/219 |
| 6,697,276 B1 * | 2/2004 | Pereira et al. ............. 365/49 |
| 6,708,250 B2 * | 3/2004 | Gillingham ............... 711/108 |
| 6,748,484 B1 | 6/2004 | Henderson et al. |
| 6,754,800 B2 * | 6/2004 | Wong et al. ............... 711/216 |
| 6,763,426 B1 | 7/2004 | James et al. |
| 6,889,225 B2 * | 5/2005 | Cheng et al. ............. 707/100 |
| 6,892,237 B1 * | 5/2005 | Gai et al. ................. 709/224 |
| 2002/0094084 A1 | 7/2002 | Wasilewski et al. |
| 2002/0161969 A1 | 10/2002 | Nataraj et al. |
| 2002/0178341 A1 * | 11/2002 | Frank ...................... 711/216 |
| 2003/0188089 A1 | 10/2003 | Perloff |

OTHER PUBLICATIONS

Fielding et al., Hypertext Transfer Protocol—HTTP/1.1, IETF Network Working Group, Published 1999, p. 25.*

(Continued)

*Primary Examiner*—Moustafa M. Meky
(74) *Attorney, Agent, or Firm*—Bever, Hoffman & Harms

(57) ABSTRACT

A server is provided having a port for receiving a data request that includes an identifier (e.g., an HTTP request that includes a URL). Recognition logic is provided to extract the identifier, using delimiters present in the data request. Padding logic fixes the length of the identifier at a predetermined length (e.g., by adding zeros to the end of the identifier), thereby creating a fixed-length identifier. Hashing logic is provided to perform a hashing function on the fixed-length identifier, thereby creating a hashed identifier. A CAM array provides an index value in response to the hashed identifier if the hashed identifier matches a hashed identifier value stored in the CAM array. A cache memory stores information associated with the identifier (e.g., web page data), at a location associated with the index value. The cache memory provides this information to a requesting party in response to the index value.

25 Claims, 4 Drawing Sheets

OTHER PUBLICATIONS

Improved Caching on Net.Commerce Pages, IBM Technical Disclosure Bulletin, Published May 2001, Issue 445 Page No. 863.*

"IPv4", http://en.wikipedia.org/wiki/IPv4, pp. 1-4.
"IPv6," http://en.wikipedia.org/wiki/IPv6, pp. 1-9.

* cited by examiner

USE OF HASHED CONTENT ADDRESSABLE MEMORY (CAM) TO ACCELERATE CONTENT-AWARE SEARCHES

RELATED APPLICATIONS

The present application is related to U.S. patent application Ser. No. 10/173,516, by David A. Honig, entitled "Hardware Hashing of Content Addressable Memory (CAM) Input to Emulate a Wider CAM", still pending.

BACKGROUND OF THE INVENTION

1. Field of the Invention

The present invention relates to the use of a hashed content addressable memory (CAM) array to accelerate content-aware searches. More specifically, the present invention relates to the use of a hashed CAM array to retrieve data from a cache memory in a web server by quickly recognizing a request.

2. Related Art

FIG. 1 is a block diagram of a conventional web server 100, which includes network interface card (NIC) 110, central processing unit (CPU) 101, web page storage disk 102 and cache memory 103. Web server 100 accepts HTTP requests on TCP port 80. Each of these HTTP requests contain the delimiter "GET", which is followed by a space, which is followed by a Universal Resource Locator (URL), which is followed by another space. One example of an HTTP request might therefore be:

"GET_http://www.IDT.com/products/abc/bar/index/html_"

where "_" represents a space. This format is specified by the HTTP protocol documents. Upon receiving the HTTP request, from NIC 110, CPU 101 must parse the URL string in order to traverse the file system of web page storage disk 102. Using the parsed URL string, CPU 101 retrieves the web page data identified by the URL from web page storage disk 102. This retrieved web page data is then transmitted from CPU 101 to the requesting party, via NIC 110.

Web server 100 can also cache popular pages in cache random access memory (RAM) 103 in order to avoid access to web page storage disk 102. Web server 100 might also cache parts of the file system structure to speed traversal. Cache RAM 103 is accessed in a manner similar to web page storage disk 102. Thus, upon receiving an HTTP request, CPU 101 must parse the URL string. Using the parsed URL string, CPU 101 retrieves the web page data identified by the URL from cache RAM 103. This retrieved web page data is then transmitted from CPU 101 to the requesting party, via NIC 110. However, the resulting acceleration is limited by the speed of the searches. If a million pages are cached in cache RAM 103 and organized in a binary tree, recognizing a URL would take at least $\log_2(10^6)$ steps (i.e., 20 steps).

It would therefore be desirable to have a more efficient way of retrieving web page data stored in a web server in response to a URL (e.g., without requiring parsing of the URL). More generally, it would be desirable to have a more efficient way of retrieving "information" or "content" from a web server in response to an "identifier" or a "name".

SUMMARY

Accordingly, the present invention provides a web server that accesses a cache memory using a hashed CAM array. The server includes a port for receiving a data request (e.g., an HTTP request), which includes an identifier (e.g., a URL). Recognition logic is provided to extract the identifier from the data request, using delimiters present in the data request. For example, the recognition logic may use the "GET_" delimiter of an HTTP request to recognize the beginning of a URL, and the space following the URL to recognize the end of the URL. After the recognition logic extracts the identifier (e.g., URL), padding logic is used to ensure that the identifier exhibits a predetermined length. For example, the padding logic can add zeros to the end of the identifier until the identifier exhibits the predetermined length. The resulting identifier is referred to as a fixed-length identifier.

Hashing logic is provided to perform a hashing function on the fixed-length identifier, thereby creating a hashed identifier. The hashed identifier has a predetermined length, which is determined by the nature of the hashing function. The predetermined length of the hashed identifier is less than the predetermined length of the fixed-length identifier. The reduced length of the hashed identifier enables the hashed identifier to be applied to a CAM array.

The CAM array is configured to store a plurality of hashed identifier values (each corresponding with a unique identifier). Each of the hashed identifier values stored in the CAM array corresponds with information (e.g., web page data) stored in a cache memory. More specifically, each of the hashed identifier values stored in the CAM array points to information in the cache memory that would have been pointed to by the unhashed (original) identifier.

The hashed identifier provided by the hashing function is applied to the CAM array. If this hashed identifier matches one of the hashed identifier values stored in the CAM array, then the CAM array will provide an index value associated with the matched hashed identifier value. The index value is applied to the cache memory. In response, the cache memory retrieves the information (e.g., web page data) associated with the identifier (e.g., URL). This information is then provided to the requesting party.

Using the CAM array and cache memory to retrieve the information associated with the identifier enables this information to be retrieved in a relatively fast manner compared to conventional web server 100 (FIG. 1). Notably, the present invention does not require parsing of the identifier (e.g., URL). However, the reduced length of the hashed identifier requires an exact match within the CAM array.

The present invention will be more fully understood in view of the following description and drawings.

DETAILED DESCRIPTION

Figure 1:
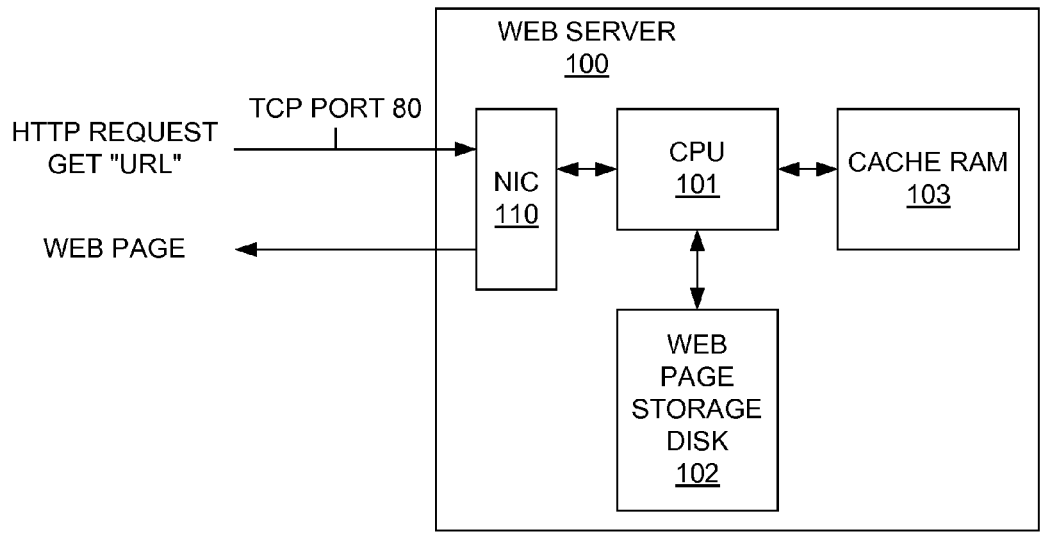
FIG. 1 is a simplified block diagram of a conventional web server.
Figure 2:
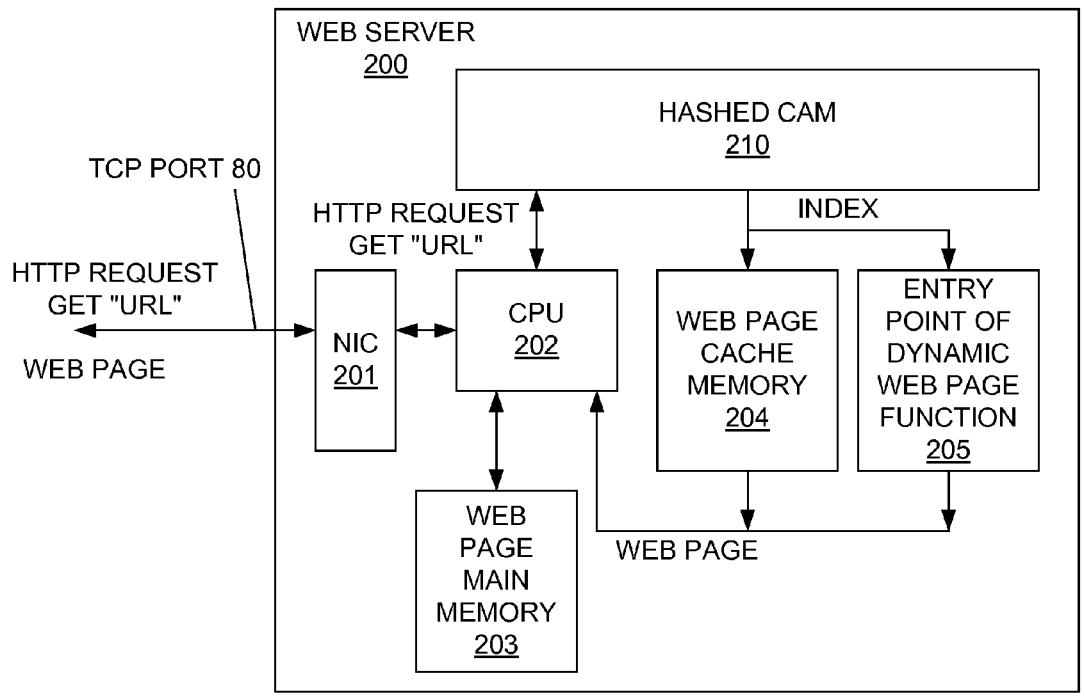
FIG. 2 is a simplified block diagram of a web server in accordance with one embodiment of the present invention.

FIG. 2 is a block diagram of a web server 200 in accordance with one embodiment of the present invention. Web server 200 includes NIC 201, CPU 202, web page main memory 203, web page cache memory 204, entry point of dynamic web page function 205, and hashed binary content addressable memory (CAM) 210.

In general, web server 200 operates as follows. NIC 201 receives the HTTP request on TCP port 80. This HTTP request is provided to CPU 202, which in turn, provides the HTTP request to hashed CAM 210. In response, hashed CAM 210 extracts the URL from the HTTP request, performs a hashing function on the URL, and determines whether the hashed URL corresponds with an entry of hashed CAM 210. If a match exists, hashed CAM 210 provides an INDEX value, which either (1) accesses corresponding web page data stored in web page cache memory 204, or (2) provides an entry point for a dynamic web page function 205 (which in turn provides corresponding web page data). The retrieved web page data is provided to CPU 202, which in turn, transmits the web page data to the requesting party, via NIC 201. Because it is not necessary to parse the received URL, web page data can be retrieved from web page cache memory 204 or dynamic web page function 205 much faster than in the prior art.

If the associated URL does not match an entry of hashed CAM 210, then CPU 202 accesses web page main memory 203 directly, thereby retrieving the associated web page data. The retrieved web page data is then provided from CPU 202 to the requesting party, via NIC 201.

Figure 3:
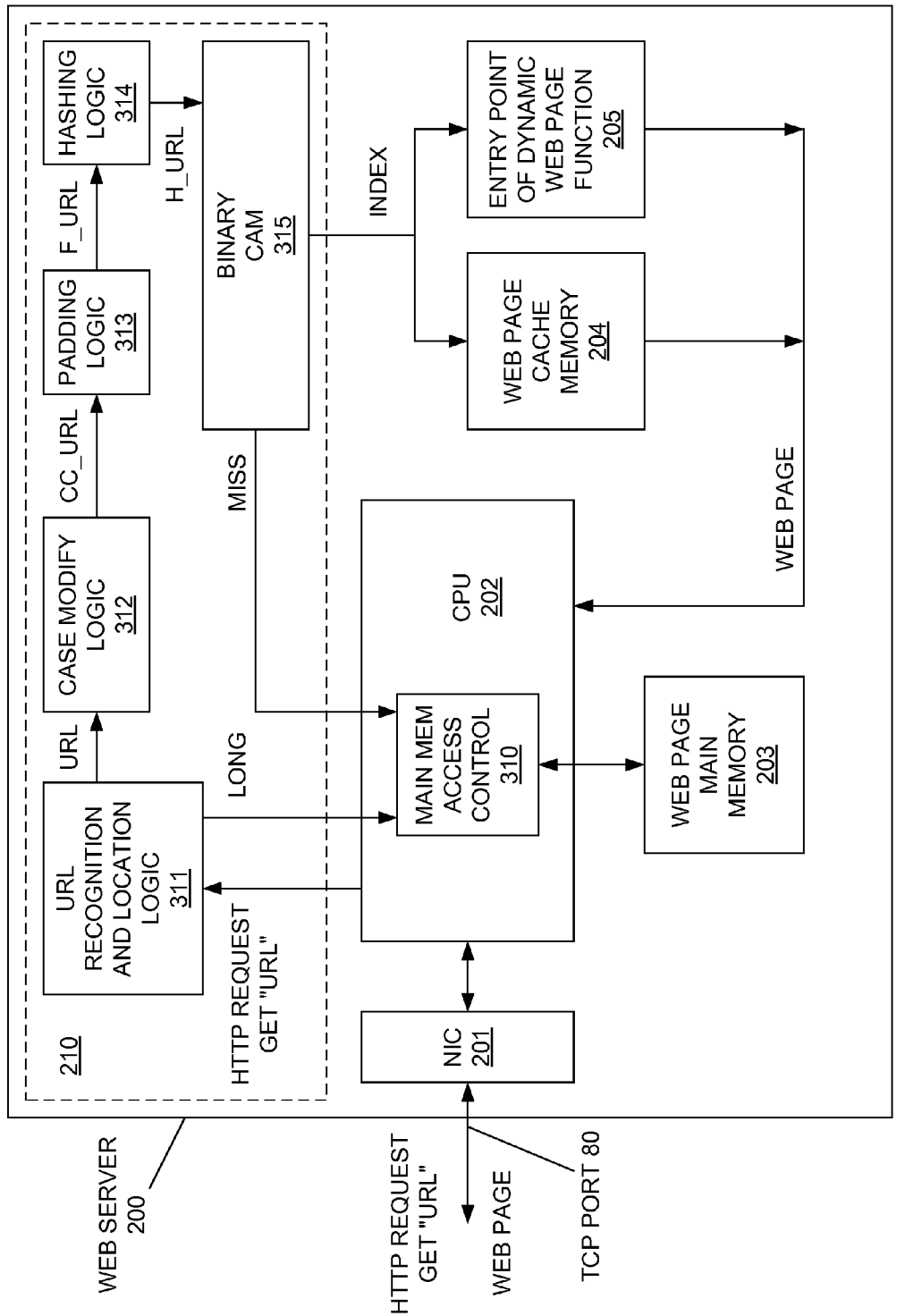
FIG. 3 is a block diagram of the web server of FIG. 2, which is expanded to illustrate elements of hashed CAM, in accordance with one embodiment of the present invention.

FIG. 3 is a block diagram of web server 200, which is expanded to illustrate elements of hashed CAM 210, in accordance with one embodiment of the present invention. As illustrated in FIG. 3, hashed CAM 210 includes main memory access controller 310, URL recognition and location logic 311, case modification logic 312, padding logic 313, hashing logic 314, and binary CAM array 315. In the described embodiment, web page main memory 203 comprises one or more hard disk drives. Web server 200 receives HTTP requests on TCP port 80. As described above, HTTP requests are of the form "GET_URL_". More specifically, an HTTP request is characterized by an IP header field, followed by a TCP header field, followed by a "GET_URL_" statement (e.g., IP Header, TCP Header 80, GET_URL_). URL recognition and location logic 311 is configured to detect the IP Header, followed by the TCP Header 80, followed by the "GET_URL_" statement. Upon detecting these delimiters, URL recognition and location logic 311 extracts the URL located between the space delimiters at the beginning and end of the "GET" statement.

URL recognition and location logic 311 transmits the extracted URL to case modification logic 312, which ensures that all characters of the URL have the same case (i.e., upper case or lower case). In the described embodiment, case modification logic 312 is configured to change all upper case characters to lower case characters, such that case modification logic 312 provides a case-consistent URL (CC_URL) having all lower case characters. In another embodiment, case modification logic 312 can be configured to change all lower case characters to upper case characters, such that case-consistent URL (CC_URL) has all upper case characters. In yet another embodiment, the case-conversion step may be skipped, if case-sensitivity is desired.

Case modification logic 312 provides the case-consistent URL (CC_URL) to padding logic 313. Padding logic 313 is configured to create a fixed-length URL (F_URL) having a predetermined length, N, in response to the received case-consistent URL (CC_URL). In the described example, the case-consistent URL (CC_URL) has a length less than or equal to the predetermined length, N. Padding logic 313 adds predetermined characters (e.g., zero characters) to the end of the case-consistent URL (CC_URL), as necessary, to create a fixed-length URL (F_URL) having the predetermined length, N. For example, if N is equal to 300 characters, and the case-consistent URL (CC_URL) provided by case modification logic 312 has a length of 273 characters, then padding logic 312 adds 27 zero characters to the end of case-consistent URL (CC_URL) to create fixed-length URL (F_URL). Although the present embodiment places case modification logic 312 before padding logic 313, this is not necessary.

Note that in one embodiment, the predetermined length N can be selected to be longer than any URL supported by web server 200. In another embodiment, the predetermined length N is selected to be longer than most URLs supported by web server 200. In this embodiment, URL recognition and location logic 311 is configured to compare the length of the received URL with the predetermined length N. If URL recognition and location logic 311 determines that the received URL has a length greater than the predetermined length N, then URL recognition and location logic 311 activates a control signal (LONG). The activated LONG control signal is provided to main memory access controller 310. In response, main memory access controller 310 causes the web page associated with the received URL to be accessed from web page main memory 203.

Padding logic 313 provides the fixed-length URL (F_URL) to hashing logic 314. Hashing logic 314 hashes the fixed-length URL (F_URL) to create a hashed URL value (H_URL), which is provided to binary CAM 315. Hashing is the transformation (mapping) of a long string of characters into a shorter string of characters that represents the original string. In accordance with the present embodiment, hashing is used to transform the relatively long fixed-length URL (F_URL) to a relatively short hashed URL value (H_URL). The hashed URL value (H_URL) has a fixed length. In the described embodiment, the hashed URL value (H_URL) has a fixed length of 72-bits, which corresponds with the width of binary CAM array 315.

Hashing logic 314 can use various types of hashing algorithms to create the hashed URL value (H_URL). If a hash function produces the same hash value from two different inputs, this is known as a collision. A hash function that offers an extremely low risk of collision may be considered acceptable. For accelerating a search, it would be desirable for the hashing function to disperse similar inputs to dissimilar outputs, and produce collisions no more frequently than expected for a random selection of output values. In this context, "similar" means differing in only a few bits (i.e., a small "Hamming distance"). Hashing logic 314 can implement one or more conventional hashing methods, including, but not limited to: a division-remainder method, a folding method, a radix transformation, or digit rearrangement. In a particular embodiment, hashing logic 314 implements the well-studied, hardware-efficient and fast block cipher known as DES (Data Encryption Standard), producing a desirable random-like output distribution. One of ordinary skill in the art will recognize that the "avalanche" properties of DES (i.e., changing one input bit changes half of the output bits, on average) provides a desirable dispersion in the hashing function. The use of DES to implement hashing logic (such as hashing logic 314) is described in more detail in commonly owned, co-filed U.S.

patent application Ser. No. 10/173,516, by Honig, entitled "Hardware Hashing of Content Addressable Memory (CAM) Input to Emulate a Wider CAM".

Hashing logic 314 provides the hashed URL value (H_URL) to binary CAM array 315 as a compare input value. Binary CAM array 315 is programmed to store a plurality of hashed URL values. In the described embodiment, binary CAM array 315 has a depth of 1M (1,048,576) entries, such that binary CAM array 315 is capable of storing 1M hashed URL values. Binary CAM array 315 can have other depths and widths in other embodiments. Each hashed URL value stored in binary CAM array 315 corresponds with web page data stored in web page cache memory 204. If the hashed URL value (H_URL) provided by hashing logic 314 matches one of the hashed URL values stored in binary CAM array 315, then binary CAM array 315 provides an INDEX value representative of the location of the corresponding web page data in web page cache memory 204. This INDEX value is used to access this corresponding web page data in web page cache memory 204. The corresponding web page data is transmitted to the output port of web server 200, to the requesting party, via CPU 202 and NIC 201.

Figure 4:
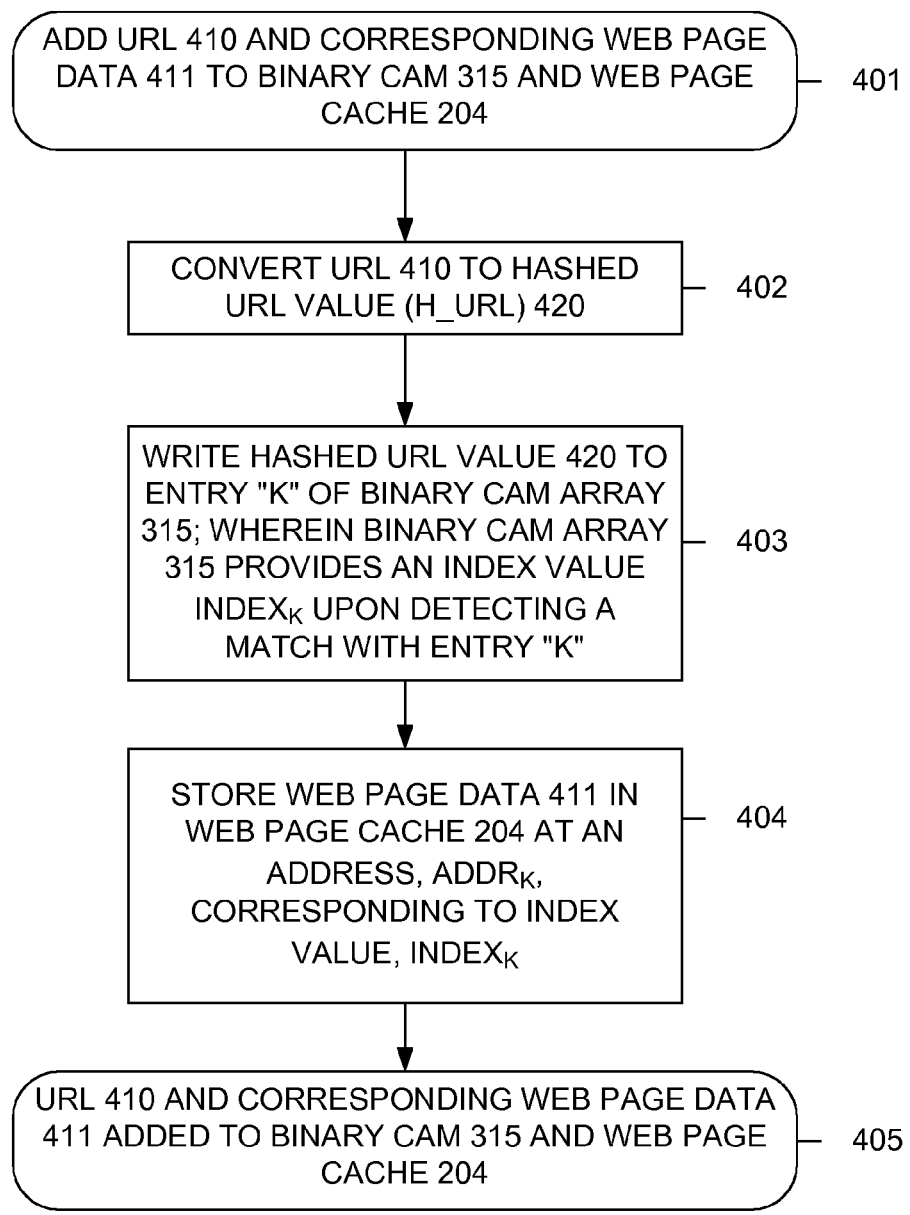
FIG. 4 is a flow diagram illustrating the addition of a URL and the corresponding web page data to the binary CAM array and the web page cache memory of FIG. 3 in accordance with one embodiment of the present invention.

FIG. 4 is a flow diagram illustrating the addition of a URL 410 and the corresponding web page data 411 to binary CAM array 315 and web page cache memory 204 in accordance with one embodiment of the present invention. The addition of URL 410 and corresponding web page data 411 is initiated in Step 401. URL 410 is converted to a hashed URL value 420 by URL recognition and location logic 311, case modification logic 312, padding logic 313 and hashing logic 314 in the manner described above (Step 402). The hashed URL value 420 is then written to an entry (i.e., entry "K", where K is a whole number from 0 to 1,048,575, inclusive) of binary CAM array 315 (Step 403). Note that if a hashed URL value subsequently applied to binary CAM array 315 during a compare operation matches the hashed URL value 420 stored in entry "K", then binary CAM array 315 provides a corresponding output index value, $INDEX_K$ (Step 403). The web page data 411 corresponding to URL 410 is written to web page cache memory 204 at an address $ADDR_K$ corresponding with index value, $INDEX_K$ (Step 404). Thus, the index value $INDEX_K$ can be used to access the web page data 411 stored at address $ADDR_K$ of web page cache memory 204 during a subsequent compare operation. At this time, URL 410 and corresponding web page data 411 have been added to binary CAM 315 and web page cache memory 204 (Step 405). In the described example, up to 1,048,576 of the most popular web pages in web server 200 can be stored in web page cache memory 204.

Figure 5:
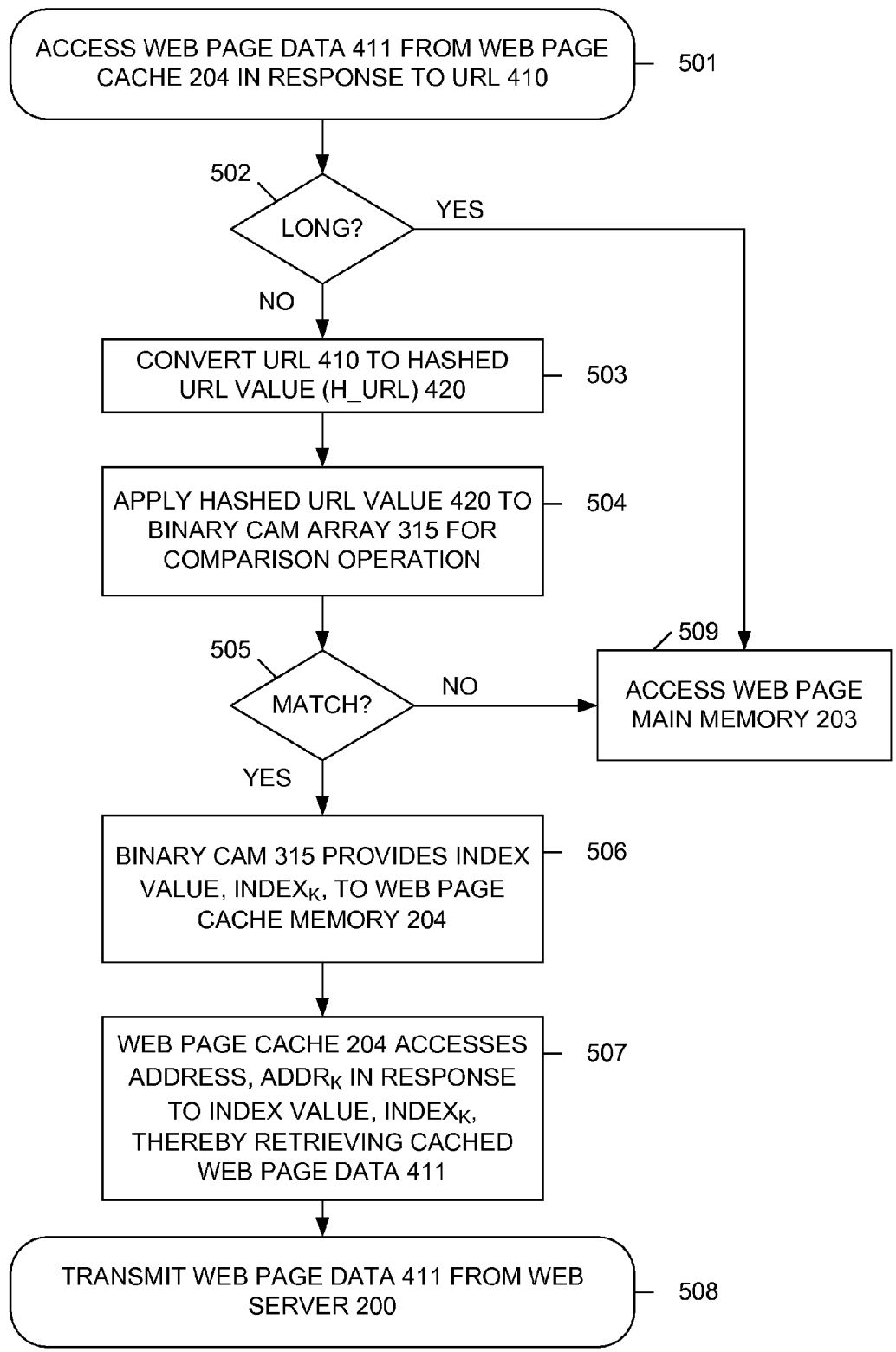
FIG. 5 is a flow diagram illustrating the accessing of web page data from the web page cache memory of FIG. 3 in response to a URL in accordance with one embodiment of the present invention.

FIG. 5 is a flow diagram illustrating the accessing of web page data 411 from web page cache memory 204 in response to URL 410 in accordance with one embodiment of the present invention. The access of web page data 411 is initiated in Step 501. URL 410 is applied to TCP port 80 of web server 200, and URL recognition and location logic 311 determines whether the URL 410 has a length greater than the predetermined length N (Step 502). If URL recognition and location hardware 311 determines that the received URL 410 is longer than the predetermined length N (Step 502, Yes Branch), then the associated web page is retrieved from web page main memory 203 (Step 509), which is accessed in accordance with conventional web server processing techniques.

If URL recognition and location logic 311 determines that the received URL 410 is not longer than the predetermined length N (Step 502, No Branch), then URL 410 is converted to a hashed URL value 420 by URL recognition and location hardware 311, case modification logic 312, padding logic 313 and hashing logic 314 in the manner described above (Step 503).

The associated hashed URL value 420 is applied to binary CAM array 315, thereby comparing the hashed URL value 420 with the hashed URL values previously stored in binary CAM array 315 (Step 504). Because the hashed URL value 420 was previously written to binary CAM array 315, a match exists in the present example (Step 505, Yes Branch). As a result, binary CAM array 315 provides the associated index value, $INDEX_K$, to web page cache memory 204 (Step 506). If a match did not exist (Step 505, No Branch), then the associated web page is retrieved from web page main memory 203 (Step 509), which is accessed in accordance with conventional web server processing techniques.

Binary CAM array 315 uses the $INDEX_K$ value to access the web page data 411 stored at address $ADDR_K$ of web page cache memory 204 (Step 507). In one embodiment, the $INDEX_K$ value is equal to the address value $ADDR_K$. In another embodiment, the $INDEX_K$ value is mapped to the address value $ADDR_K$. The web page data 411 is then transmitted from web server 200 to the requesting party (Step 507). Note that the use of hashed URL values means that only exact matches may be performed within binary CAM array 315.

In accordance with another variation of the present invention, binary CAM array 315 provides an INDEX value that does not correspond with web page data stored in web page cache memory 204, but rather, provides an INDEX value that corresponds with an entry address for a dynamic web page function 205. Dynamic web page function 205 provides a web page that is generated on the fly by a program in web server 200 (e.g., a CGI program). To cache dynamic web page function 205, the INDEX value provided by binary CAM array 315 is used to transfer control to the program entry point of dynamic web page function 205.

Although the present example describes a structure and method for accessing web page data stored in web page cache memory 204, it is understood that in other embodiments, the present invention can be applied to access all of the web page data stored in web page main memory 203. This is accomplished by expanding the binary CAM 315 to have a number of entries equal to the number of web page entries in web page main memory 203. The index values provided by binary CAM array 315 are then selected to correspond with the addresses of the web page entries in web page main memory 203.

The present invention advantageously increases the lookup speed and capacity (i.e., the number of URLs stored in CAM array 315) of the cached web pages in web server 200, without requiring a large amount of additional hardware. The required logic of URL recognition and location logic 311, case modification logic 312 and padding logic 313 uses few resources compared to the hashing logic 314 and binary CAM array 315. Binary CAM array 315 allows web page data in the web page cache memory 204 to be retrieved with minimal search time. Web server 200 does not require the received URL to be parsed in order to retrieve web page data from web page cache memory 204. Moreover, web server 200 does not require processing to search a binary tree in a plurality of steps to retrieve web page data from web page cache memory 204.

Web server 200 advantageously implements CAM-rate recognition of Layer 4 and above. Web server 200 also handles arbitrary length URLs (up to the predetermined length N), and handles variable capitalization (via trivial hardware lower-casing or upper-casing). Moreover, storing URLs individually means that finer control can be exerted over the URLs that are cached. For example, a pattern like "http://www.idt.com/abc/bar/*.html" might be too general, and restricting this pattern by adding exclusionary terms (e.g., AND NOT "http://www.idt.com/abc/bar/advance.html") might be expensive or impossible using other methods.

Although the specific example of accelerating lookups on an HTTP server is described, the methods disclosed can be applied more generally, where inspecting payload contents is used to direct or accelerate flow. For example, although the described example recognizes a URL in response to the GET and space delimiters, it is understood that other information, generically identified as "label" or "name", can be recognized using other delimiters in other embodiments, thereby enabling use with future protocols. Moreover, although the described example provides web page data as output data, it is understood that other output data, which is more generically defined as "content" or "information", can be provided as a result of the binary CAM comparison.

Although the invention has been described in connection with several embodiments, it is understood that this invention is not limited to the embodiments disclosed, but is capable of various modifications, which would be apparent to a person skilled in the art. Thus, the invention is limited only by the following claims.

The invention claimed is:

1. A web server comprising:
   a port for receiving a data request that includes an identifier having a arbitrary length;
   recognition logic for recognizing the identifier in the data request;
   padding logic configured to add one or more predetermined characters to the identifier, as necessary, to create a fixed-length identifier having a predetermined length;
   hashing logic for hashing the fixed-length identifier, thereby creating a hashed identifier;
   a content addressable memory (CAM) array coupled to receive the hashed identifier, the CAM array providing an index value in response to the hashed identifier if the hashed identifier matches an entry of the CAM array; and
   a cache memory coupled to receive the index value from the CAM array, wherein the cache memory is configured to store information associated with the identifier at a location associated with the index value.

2. The web server of claim 1, wherein the identifier is a uniform resource locator (URL).

3. The web server of claim 1, wherein the data request is an HTTP request.

4. The web server of claim 3, wherein the HTTP request comprises:
   A "GET" delimiter;
   A first space delimiter following the GET delimiter;
   A uniform resource locator (URL) following the first space delimiter; and
   A second space delimiter following the URL.

5. The web server of claim 1, wherein the recognition logic includes, logic for determining whether the identifier exceeds a predetermined length.

6. The web server, of claim 5, further comprising a main memory that is directly accessed if the recognition logic determines the identifier exceeds the predetermined length.

7. The web server of claim 1, wherein the CAM array is a binary CAM array.

8. The web server of claim 1, wherein the predetermined characters are zero characters.

9. The web server of claim 1, wherein the cache memory is configured to provide the information in response to the index value.

10. The web server of claim 1, wherein the information comprises web page data.

11. The web server of claim 1, further comprising a dynamic web page program coupled to receive the index value from the CAM array, wherein the dynamic web page program is launched in response to the index value.

12. The web server of claim 1, further comprising a main memory that is directly accessed if the hashed identifier does not match any entry of the CAM array.

13. The web server of claim 1, further comprising case modification logic for causing characters of the identifier to have the same case.

14. A web server comprising:
   a port for receiving a hypertext transfer protocol (HTTP) request including a uniform resource locator (URL);
   hashing logic configured to hash the URL, thereby creating a hashed identifier;
   a content addressable memory (CAM) array configured to store a plurality of hashed identifier values, the CAM array coupled to receive the hashed identifier from the hashing logic, the CAM array being configured to provide an index value if the hashed identifier provided by the hashing logic matches a hashed identifier value stored in the CAM array; and
   a cache memory coupled to receive the index value from the CAM array, and in response, provide web page data associated with the URL.

15. A method of implementing a web server comprising:
   receiving a data request that includes an identifier having an arbitrary length;
   recognizing the identifier in the data request;
   adding one or more predetermined characters to the identifier, as necessary, to create a fixed-length identifier having a first predetermined length;
   hashing the fixed-length identifier, thereby creating a hashed identifier having a second predetermined length, shorter than the first predetermined length;
   comparing the hashed identifier with hashed identifier values stored in a content addressable memory (CAM) array;
   providing an index value with the CAM array in response to the hashed identifier if the hashed identifier matches one of the hashed identifier values stored in the CAM array; and
   retrieving information associated with the identifier from a cache memory in response to the index value.

16. The method of claim 15, wherein the identifier is a uniform resource locator (URL).

17. The method of claim 15, wherein the data request is an HTTP request.

18. The method of claim 17, wherein the step of recognizing the identifier comprises recognizing a "GET" delimiter of the HTTP request, followed by a first space delimiter, followed by a uniform resource locator (URL), followed by a second space delimiter.

19. The method of claim 15, further comprising determining whether the identifier exceeds the predetermined length.

20. The method of claim 19, further comprising directly accessing information from a main memory of the web server if the identifier exceeds the predetermined length.

21. The method of claim 15, wherein the predetermined characters are zero characters.

22. The method of claim 15, wherein the information comprises web page data.

23. The method of claim 15, further comprising launching a dynamic web page program in response to the index value.

24. The method of claim 15, further comprising directly accessing information from a main memory of the web server if the hashed identifier does not match any of the hashed identifier values stored in the CAM array.

25. The method of claim 15, further comprising modifying characters of the identifier, such that all of the characters of the identifier have the same case.

* * * * *